United States Patent
Scott

(10) Patent No.: US 9,551,149 B1
(45) Date of Patent: Jan. 24, 2017

(54) SYSTEMS AND METHODS FOR EFFICIENTLY ASSEMBLING A STRUCTURE

(71) Applicant: W. Forrester & Company, Inc., Smyrna, GA (US)

(72) Inventor: Douglas Wayne Scott, Smyrna, GA (US)

(73) Assignee: W. Forrester & Company, Inc., Smyrna, GA (US)

( * ) Notice: Subject to any disclaimer, the term of this patent is extended or adjusted under 35 U.S.C. 154(b) by 0 days.

(21) Appl. No.: 14/972,070

(22) Filed: Dec. 16, 2015

(51) Int. Cl.
*E04C 2/42* (2006.01)
*E04B 1/38* (2006.01)
*E04H 17/20* (2006.01)
*E04H 17/16* (2006.01)

(52) U.S. Cl.
CPC .............. *E04C 2/428* (2013.01); *E04B 1/38* (2013.01); *E04H 17/16* (2013.01); *E04H 17/20* (2013.01)

(58) Field of Classification Search
CPC ............ E04C 2/428; E04B 1/38; E04H 17/16; E04H 17/20; E04H 1/1205; E04H 1/005; E04H 1/12; E04H 2001/1283; A63H 33/067; Y10T 403/73; Y10T 403/4602
USPC .......................................................... 52/79.5
See application file for complete search history.

(56) References Cited

U.S. PATENT DOCUMENTS

| | | | | | |
|---|---|---|---|---|---|
| 2,332,652 A | * | 10/1943 | Mackenzie | .............. | B65D 9/18 217/16 |
| 4,127,156 A | * | 11/1978 | Brandt | ...................... | E06B 9/01 160/179 |
| 4,235,559 A | * | 11/1980 | Rooklyn | .................. | F16B 12/30 403/171 |
| 4,299,067 A | * | 11/1981 | Bertschi | ................ | E04B 1/6162 403/296 |
| 4,701,065 A | * | 10/1987 | Orosa | ...................... | A47C 5/02 403/217 |
| 5,564,381 A | * | 10/1996 | Wiesen | ...................... | F01B 3/00 123/195 S |
| 6,119,288 A | * | 9/2000 | Hendrickson | ........ | A47D 13/063 5/97 |
| 6,231,142 B1 | * | 5/2001 | Pochet | ..................... | H02B 1/16 211/189 |
| 7,334,377 B2 | * | 2/2008 | Dubensky | ............. | E04B 1/3483 52/653.2 |

(Continued)

*Primary Examiner* — Brian Glessner
*Assistant Examiner* — Paola Agudelo
(74) *Attorney, Agent, or Firm* — Clayton, McKay & Bailey, PC

(57) ABSTRACT

Embodiments described herein include systems and methods for efficiently assembling a structure. In one embodiment, a system includes multiple panels, with each panel having a frame made of multiple members. Each member of the frame has at least two pairs of passageways. Each pair of passageways can include two passageways that intersect each other in a perpendicular manner. Furthermore, each passageway may pass through, and be oriented orthogonal to, the longitudinal axis of the member. The first pair of passageways can be spaced a first distance from the first end of the member, while the second pair of passageways can be spaced a second distance from the second end of the member. In some embodiments, the first and second distances are approximately equal to one another. This consistency allows for maximum interchangeability and compatibility of the members and/or panels.

18 Claims, 4 Drawing Sheets

(56) References Cited

U.S. PATENT DOCUMENTS

| | | | | |
|---|---|---|---|---|
| 8,720,700 | B2* | 5/2014 | Fan | H05K 7/1488 211/191 |
| 9,114,325 | B1* | 8/2015 | Sternhill | A63H 33/067 |
| 2007/0175158 | A1* | 8/2007 | Cope | E04B 1/2604 52/585.1 |
| 2009/0239441 | A1* | 9/2009 | Hu | A63H 33/10 446/123 |
| 2010/0223866 | A1* | 9/2010 | Melville | A01K 1/0236 52/282.1 |
| 2012/0013236 | A1* | 1/2012 | Fan | H05K 7/1488 312/351.1 |
| 2014/0299829 | A1* | 10/2014 | Herman | B23K 31/02 256/46 |

* cited by examiner

SYSTEMS AND METHODS FOR EFFICIENTLY ASSEMBLING A STRUCTURE

DESCRIPTION OF THE EMBODIMENTS

Field of the Embodiments

The embodiments herein relate generally to systems and methods for efficiently assembling a structure, and, more specifically, to systems and methods for efficiently assembling a structure with limited or no use of tools.

Background

Typically, when a person needs a particular structure for their property, they must either build the structure themselves, buy a kit that requires assembly, or buy the finished structure itself. Chicken coops, chicken runs, pens, small animal cages, trellises, fences, and planters, for example, may be available as finished structures. But if the buyer wants a different size, shape, or configuration, he or she must build the coop (or other structure) by hand. This requires sourcing the materials, such as wood and chicken wire, as well as tools for putting those materials together. The buyer then needs to nail or screw the wood together and cut and attach the chicken wire somehow. Even then, however, the structure may be difficult to modify after it has been completed—requiring nails or screws to be extracted from the wood in order to reconfigure the structure.

Kits are sometimes available with partially assembled structures. But these kits typically require specialized tools to put together and, once assembled, are not reversible. The kits also tend to be expensive, perhaps because they include specialized tools and fasteners, among other reasons. Finally, these kits are designed to be assembled in only one configuration and simply do not work in alternate configurations.

The need to change a chicken coop or fence structure can arise, for example, when the number of chickens increases or decreases. Similarly, planter or trellis size can change based on numbers and types of plants, and changes to sun and shade zones in different seasons or years. Current kits do not allow for easy changes to the structure, nor easy breakdown and storage of parts that are temporarily not in use. Many users are not comfortable modifying kits or building their own structures from scratch.

Therefore, a need exists for a system that allows a user to assemble a structure by themselves, at low cost, without using specialized tools, and while retaining an ability to deconstruct and reconfigure the structure as needed.

SUMMARY

Embodiments described herein include systems and methods for efficiently assembling a structure. In one embodiment, a system includes multiple panels, with each panel having a frame made of multiple members. As used herein, the term "member" is intended to describe a constituent part of any structure; for example, a piece of wood or other material (e.g., plastic, PVC, or metal) may be considered a member. In one embodiment, at least two members of the frame have a longitudinal axis, a first end, a second end, a first pair of passageways, and a second pair of passageways. As used herein, the term "passageway" is intended to describe any hollow channel extending between at least two surfaces; for example, a hole through a piece of wood may be considered a passageway.

Each pair of passageways can include two passageways that intersect each other in a perpendicular manner. Furthermore, each passageway may pass through, and be oriented orthogonal to, the longitudinal axis of the member. The first pair of passageways can be spaced a first distance from the first end of the member, while the second pair of passageways can be spaced a second distance from the second end of the member. In some embodiments, the first and second distances are approximately equal to one another. This consistency allows for maximum interchangeability and compatibility of the members and/or panels.

The passageways can be sized to accept a fastener. As a result, the panels can be coupled to one another by using fasteners extending through adjacent passageways of the panels. The fasteners may be cable ties, cords, strings, wires, or any other suitable device or material. The fasteners could also be a bolt and nut for more permanent applications.

The members of the frame can include more than two pairs of passageways. For example, they may each have a third pair of passageways spaced a third distance from the first pair of passageways. The third distance may be larger than the first and second distances; for example, it may be about twice as large. Alternatively, the third distance can be the same as the second distance.

The frame of each panel may include a span of material. For example, a panel may be spanned by mesh, wire, plastic, cloth, plywood, or any other suitable material. The material can be coupled to the frame by using fasteners, and/or may come preinstalled on the panels. The spanned material allows a user to join panels together to form a containment perimeter or containment area.

In another embodiment, a method is provided for assembling a structure. The method includes providing a plurality of panels, each panel comprising a frame having a plurality of members, wherein each member comprises a plurality of perpendicularly intersecting through-holes; and coupling two of the plurality of panels to one another. The coupling step further includes: extending a first fastener through a first through-hole of a first member of a first panel of the plurality of panels; extending the first fastener through a first through-hole of a first member of a second panel of the plurality of panels; securing the first fastener; extending a second fastener through a second through-hole of the first member of the first panel; extending the second fastener through a second through-hole of the first member of the second panel; and securing the second fastener. The first and second fasteners can comprise at least one of cable ties, cords, strings, bolts and nuts, or wires.

Both the foregoing general description and the following detailed description are exemplary and explanatory only and are not intended to restrict the scope of the invention as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Reference will now be made in detail to the present exemplary embodiments, including examples illustrated in the accompanying drawings. Wherever possible, the same reference numbers will be used throughout the drawings to refer to the same or like parts.

Exemplary embodiments herein disclose systems and methods for efficiently assembling a structure. The system may include a plurality of panels. Each panel includes a frame comprised of various members. The frame may be constructed from wood, plastic, metal, composite, or any other suitable material. In practice, wood may prove to be an ideal material based on cost effectiveness, attractiveness, sturdiness, and ease of use. However, the systems disclosed herein are not limited to the use of wood in any respect.

A frame may be constructed of four members arranged in a rectangular manner. In another embodiment, the frame has three members and is triangular. Frames of different shapes can be coupled together to build, for example, a chicken coop. To allow different shapes and sizes of panels to be compatible, spacing of the through-holes (i.e., passageways) can be uniform on the members of the different panels.

The members may be coupled to another using glue, epoxy, or a mechanical coupling such as nails, brads, or screws. Each member has a longitudinal axis that extends lengthwise through the center of the member. At least two members of each frame can also have two pairs of passageways. For illustrative purposes, a single member having a single pair of passageways is provided in FIG. 1.

The frames can be easily connected to each other or easy break down for storage when not in use. In gardening applications, this can allow for expanding and shrinking the gardening area based on the changing seasons. Urbanites who lack space can stack the panels for easy temporary storage.

Figure 1:
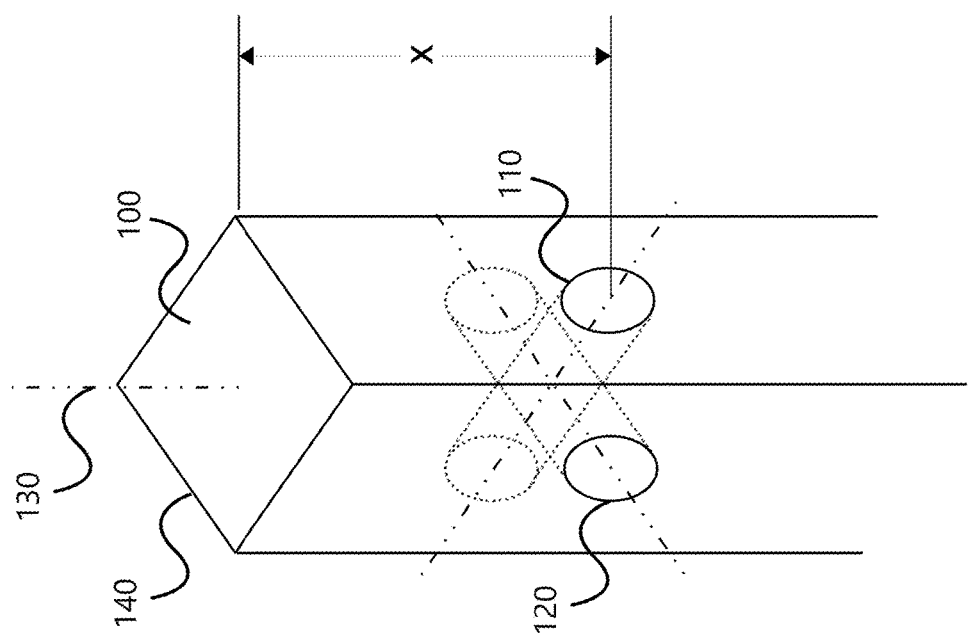
FIG. 1 is a perspective view of an example embodiment of a member having a pair of intersecting passageways.

FIG. 1 is a perspective view of an example embodiment of a member 100 having a pair of intersecting passageways 110, 120. FIG. 1 also shows a longitudinal axis 130 extending through the member 100. Each passageway 110, 120 extends through the member 100 and intersects the longitudinal axis 130. The passageways 110, 120 intersect each other in a perpendicular manner; that is, the passageways are oriented 90 degrees from one another and intersect each other at the location of the longitudinal axis 130. In one example, the passageways are at least an eighth of an inch in diameter and span the width of (e.g., pass all the way through) the member 100.

The first end 140 of the member 100 is also depicted in FIG. 1. A distance labeled x represents the distance from the first end 140 of the member 100 to the center of the passageways 110, 120. In some embodiments, this distance x is used consistently across frames and members such that the passageways of different frames align with one another and do not cause any unwanted frame overhangs or other fitment problems.

Figure 2:
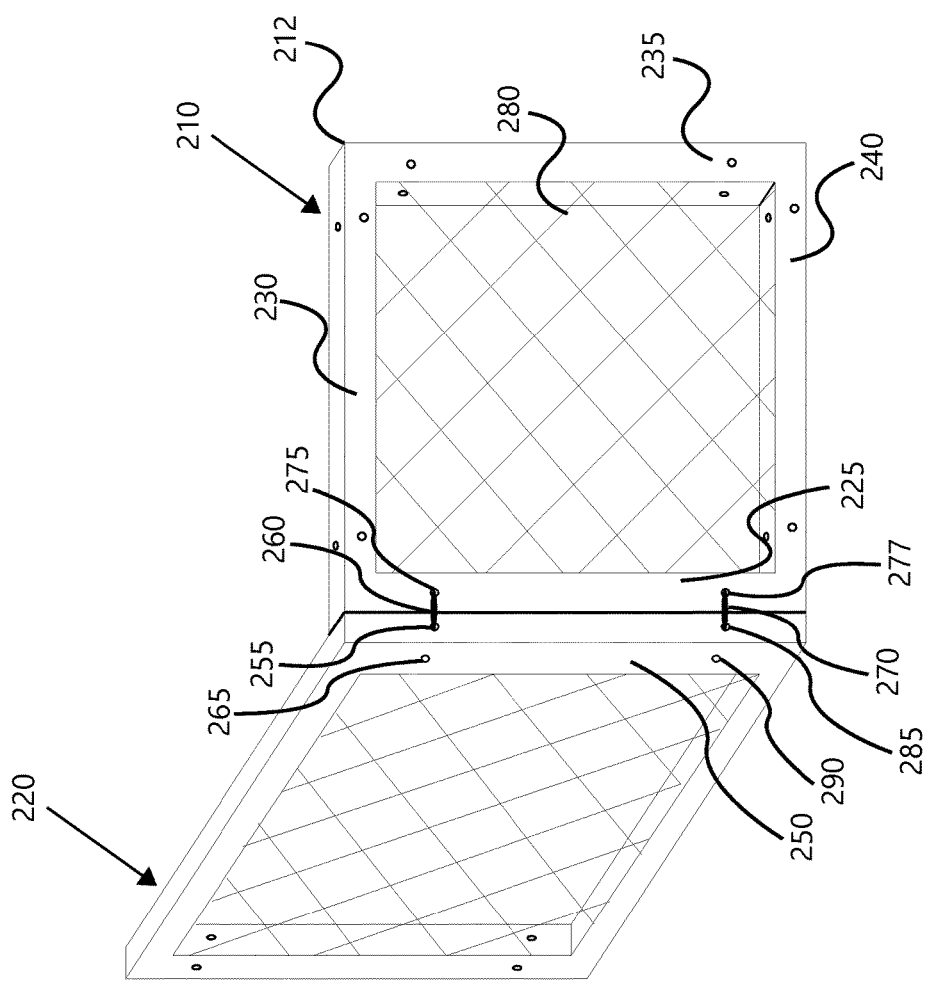
FIG. 2 is perspective view of an example embodiment of two panels joined together via fasteners.

FIG. 2 shows an example embodiment of a first panel 210 coupled to a second panel 220. The first panel 210 includes a frame 212 and a span 280 of material shown in cross-hatching. The span 280 of material may be made from any type of material. For example, span 280 may be chicken wire, metal mesh or fencing, hardware cloth, fabric, wood, or plastic. The selection of the material may depend on the intended use for the assembled structure. For example, chicken wire or metal mesh material may be suitable for a chicken coop, while cloth or plastic may be suitable for a greenhouse. As used herein, a mesh can refer to chicken wire, hardware cloth, plastic, or plywood.

Taking the first panel 210 in more detail, it can be seen that frame 212 includes four members 225, 230, 235, and 240. Although FIG. 2 shows frame 212 as one continuous item, frame 212 may also be constructed from four or more independent members. In either case, certain portions of frame 212 are considered members 225, 230, 235, 240, as labeled therein.

The first panel 210 in FIG. 2 is arranged such that it abuts the second panel 220. More specifically, member 225 of the first panel 210 abuts member 250 of the second panel 220. From the perspective shown in FIG. 2, it can be seen that member 225 includes passageways 275 and 277. These passageways 275 and 277 may each be part of a separate pair of passageways intersecting a longitudinal axis of member 225, for example as described in FIG. 1. The perspective view of member 250 shows a first pair of passageways 255 and 265, and a second pair of passageways 285 and 290.

When member 225 of the first panel 210 and member 250 of the second panel 220 are aligned with one another, as they are in FIG. 2, the respective passageways of those members are also aligned. This allows for the two panels to be coupled to another using fasteners 260 and 270. In this particular embodiment, fastener 260 extends through both passageway 255 and passageway 275. Similarly, fastener 270 extends through both passageway 285 and passageway 277. In conjunction with one another, fasteners 260 and 270 couple the first panel 210 to the second panel 220.

Alternatively, fastener 270 can couple the two panels together by extending through passageway 290 and an aligned passageway in member 225. In general, for constructing a turn, if a first passageway 277 is used on a first panel then the perpendicularly-oriented passageway 285 is used in a second panel. When panels are connected passageways with the same orientation in each panel are used. Whether the panels are being connected to form a turn or a linear extension, the user will have two options regarding which passageways to use in joining the panels.

While the embodiment of FIG. 2 shows the use of two fasteners, more may be used. Similarly, each member of a panel may have more than two pairs of passageways to support the use of more fasteners. Additional passageways also allow for the option to couple additional elements to a single member. For example, the additional passageways may be used to optionally secure a span of material to the panel. In that example, the frames may be provided without a span of material preinstalled, so that the buyer can decide on a suitable type of material and install it themselves.

Figure 3:
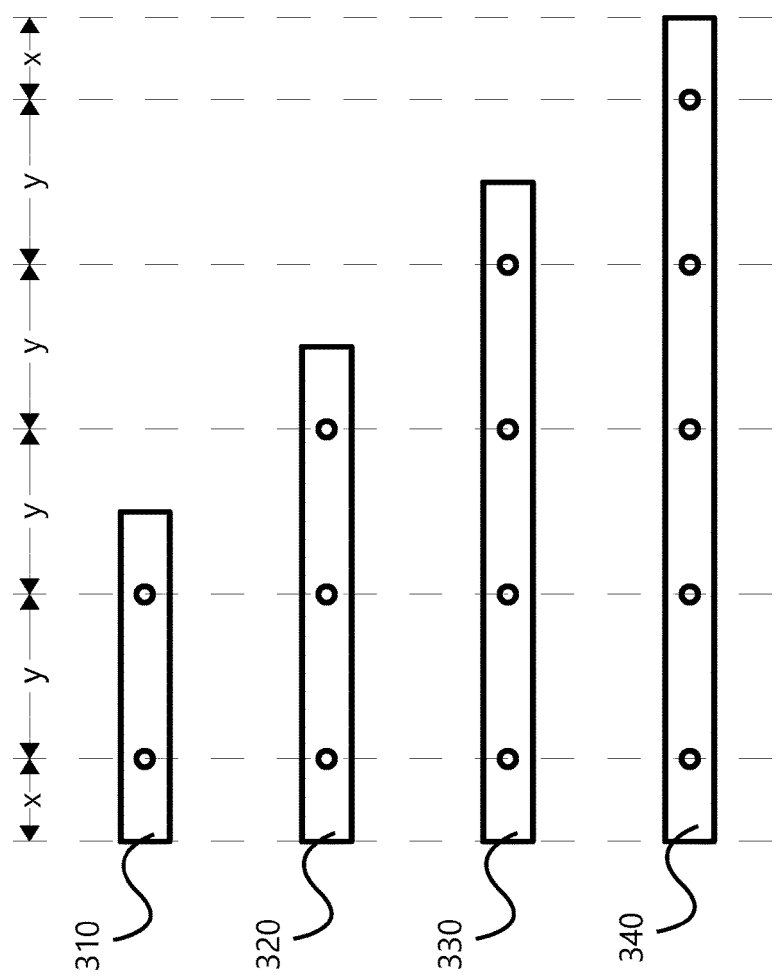
FIG. 3 is a schematic of an example embodiment of four members having passageways in alignment with one another.

As mentioned earlier, the passageways, or pair of passageways, provided across different panels may conform to a consistent spacing regime to ensure that panels are compatible with one another. FIG. 3 shows a representation of four members 310, 320, 330, and 340, having different relative lengths. In each case, however, the passageways are spaced consistently so that when the members 310, 320, 330, and 340 are aligned, their respective passageways are aligned as well.

In this particular embodiment, member 310 has two passageways (or two pairs of passageways, with the second passageway of each pair not visible). The passageways are a distance y from each other, and a distance x from the nearest end of the member 310.

Member 320 shows three passageways (or three pairs of passageways, with the second passageway of each pair not visible). Again, the passageways are equally spaced from one another at a distance y. The passageways on either end of the member 320 are spaced a distance x from the nearest end of the member 320.

Member 330 shows four passageways (or four pairs of passageways, with the second passageway of each pair not visible). Here again, the passageways are equally spaced from one another at a distance y. The passageways on either end of the member 330 are spaced a distance x from the nearest end of the member 330.

Finally, member 340 shows five passageways (or five pairs of passageways, with the second passageway of each pair not visible). Again, the passageways are equally spaced from one another at a distance y. The passageways on either end of the member 340 are spaced a distance x from the nearest end of the member 340.

In one example, the x distance can be three inches and the y distance can be six inches. This can conveniently allow for varied panel sizes of one foot, two feet, three feet and four feet in the members 310, 320, 330, and 340. By keeping the spacing of the passageways consistent, panels of different shapes and sizes can be connected together to form unique configurations.

Example configurations herein are non-limiting. One example is a raised garden bed cover. For example, an 8×4 foot bed can be covered by connecting two 4×4 panels together. The mesh of the panels can prevent birds, rabbits, and other animals from harming the raised garden. The garden box can also be built by connecting together six 1×4 foot panels.

A chicken run can be built by connecting together 3×4 foot panels as walls, and connecting a 4×4 foot panel as the ceiling. The chicken run can be expanded by simply adding additional 3×4 foot panel walls with additional 4×4 foot panel ceilings.

An A-Frame trellis can be constructed by connecting two 2×4 foot panels at one set of the 2 foot members, and standing the A-Frame up on the other 2 foot members.

In one example, stoppers that protrude outward from a member can be connected to the passageways of the member. This can be useful when one or more panels are being used as a top to a structure, such as the top to a raised garden bed. This can allow the dimensions of the top to meet or exceed the dimensions of the wall such that the top panels do not fall into the structure.

An additional support member can also be provided for extending the width of a panel or providing added support. For example, an extension member having the perpendicular passageways that align with the passageways in a member of a panel. This can allow the extension member to be attached to one of the members of the panel to provide additional panel width. In one example, the extension member is eight feet long with 2×2 inch dimensions. The length of the extension member can be selected to match the panel length. Similarly, the width and depth dimensions can be selected to match the width and depth dimensions of a member of the panel.

Figure 4:
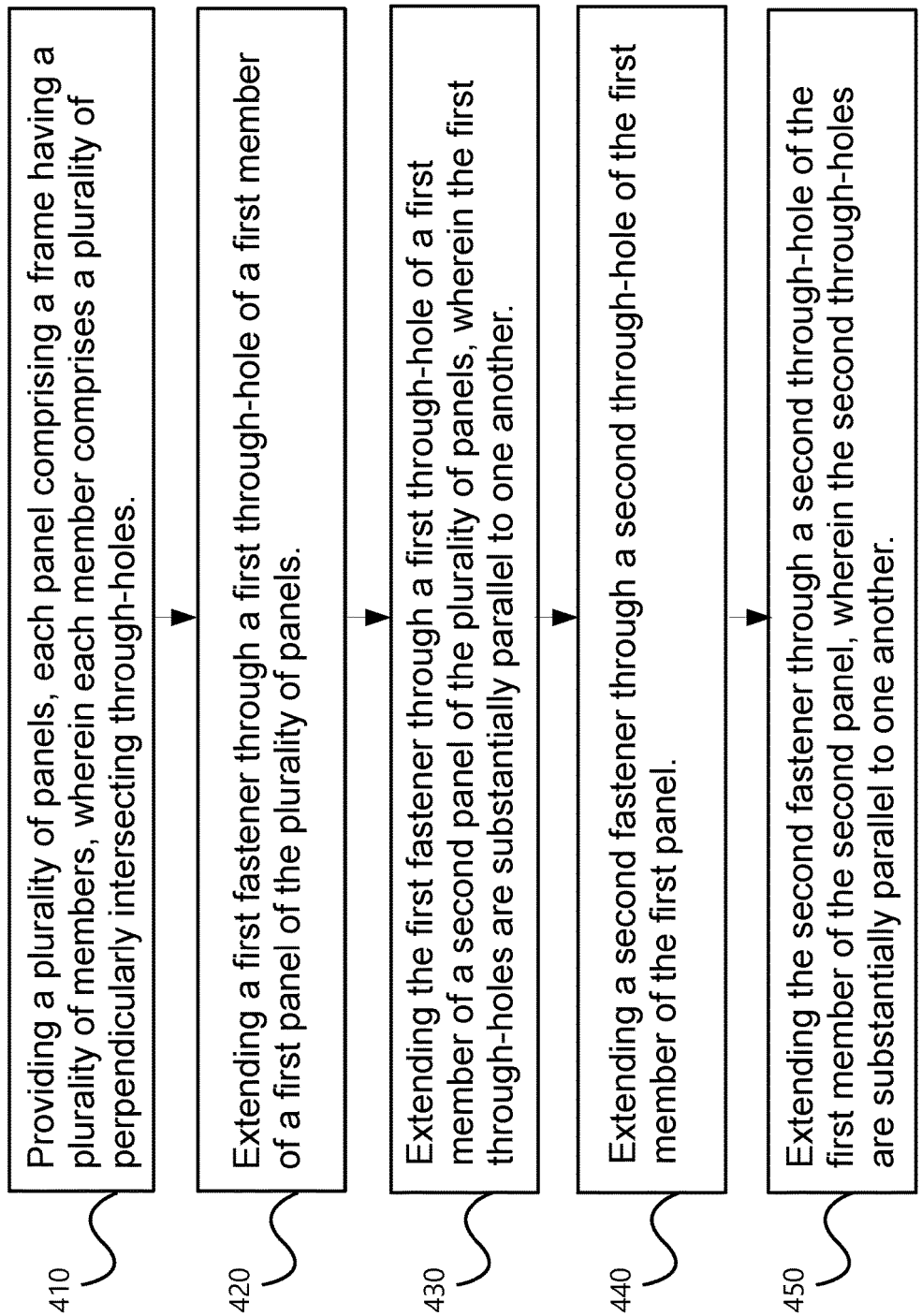
FIG. 4 is an example flow chart.

Turning to FIG. 4, an example method for attaching panels to one another is shown. At stage 410, a plurality of panels are provided that includes members with perpendicularly intersecting through-holes (e.g., passageways).

The user can then connect first and second panels at two or more locations. To make the connection at the first location, the user extends a first fastener through the first and second member in stages 420 and 430. In general, the through-holes used will be parallel to one another, allowing for an easy and secure connection.

The user makes the connection at the second location following the same technique at stages 440 and 450.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for efficiently assembling a structure, comprising:
   a plurality of panels, each panel comprising a frame having a plurality of members, wherein each member of the frame comprises a longitudinal axis, a first end, a second end;
   wherein at least first, second, and third members, of the plurality of members, each include first and second pairs of intersecting passageways that pass all the way through the respective member;
   wherein each of the first and second pair of passageways comprises two passageways that intersect one another in a perpendicular manner and are oriented orthogonal to the longitudinal axis of the member;
   wherein the first pair of passageways is spaced a first distance from the first end of the first and second members;
   wherein the second pair of passageways is spaced a second distance from the second end of the first and second members; and
   wherein the first and second distances are approximately equal to one another.

2. The system of claim 1, wherein each pair of passageways accepts a fastener down either of the two passageways.

3. The system of claim 1, wherein at least two of the plurality of panels are configured to be coupled to one another via a plurality of fasteners extending through adjacent passageways of the at least two panels.

4. The system of claim 3, wherein the plurality of fasteners comprise at least one of cable ties, cords, strings, or wires.

5. The system of claim 1, wherein each member of the frame comprises a third pair of passageways spaced a third distance from the first pair of passageways.

6. The system of claim 5, wherein the third distance is approximately twice the first or second distance.

7. The system of claim 1, wherein the first distance is approximately 3 inches.

8. The system of claim 1, wherein the frame of the panel is spanned by a spanning element including at least one of a mesh, wire, plastic, or cloth material.

9. The system of claim 8, wherein the spanning element is coupled to the frame via a plurality of fasteners.

10. The system of claim 8, wherein the spanning element is coupled to the frame via a plurality of fasteners that extend through one or more passageways.

11. The system of claim 1, wherein at least some of the plurality of panels are joined together to form a containment perimeter.

12. The system of claim 1, wherein each of the plurality of members has a square cross-sectional shape measuring 2 inches on each side.

13. A modular panel, including:
   a top member and a bottom member, the top and bottom members being parallel to one another, wherein the top and bottom members also each have at least two sets of perpendicularly intersecting passageways that pass all the way through the respective member;
   a left member and a right member, the left and right members being parallel to one another, wherein the left and right members each have at least two sets of intersecting passageways that are at least an eighth of an inch in diameter and pass all the way through the respective member, the intersecting passageways being perpendicular to one another; and a mesh that spans between the top, bottom, left, and right members, wherein the top, bottom, left, and right members are less than eight feet long.

14. The modular panel of claim 13, wherein the perpendicularly intersecting passageways of each member are consistently spaced along the respective member.

15. The modular panel of claim 14, wherein the perpendicularly intersecting passageways of each member are spaced at least 3 inches from one another.

16. The modular panel of claim 14, wherein each of the plurality of members have a square cross-sectional shape measuring 2 inches on each side.

17. A method of assembling a structure, comprising:

providing a plurality of panels, each panel comprising a frame having a plurality of members, wherein each member comprises a plurality of perpendicularly intersecting through-holes, wherein each of the plurality of panels comprises a span of mesh, wire, plastic, and/or cloth; and coupling two of the plurality of panels to one another by:

extending a first fastener through a first through-hole of a first member of a first panel of the plurality of panels;

extending the first fastener through a first through-hole of a first member of a second panel of the plurality of panels, wherein the first through-holes are substantially parallel to one another;

securing the first fastener;

extending a second fastener through a second through-hole of the first member of the first panel;

extending the second fastener through a second through-hole of the first member of the second panel, wherein the second through-holes are substantially parallel to one another; and securing the second fastener, wherein the first and second fasteners comprise at least one of cable ties, cords, strings, or wires.

18. The method of claim 17, further comprising coupling a third panel of the plurality of panels to the first panel by:

extending a third fastener through a third through-hole of the first member of the first panel;

extending the third fastener through a first through-hole of a first member of the third panel;

securing the third fastener;

extending a fourth fastener through a fourth through-hole of the first member of the first panel;

extending the fourth fastener through a second through-hole of the first member of the third panel; and securing the fourth fastener, wherein the third and fourth fasteners comprise at least one of cable ties, cords, strings, or wires.

* * * * *